US012710169B2

(12) United States Patent
Hierzer

(10) Patent No.: US 12,710,169 B2
(45) Date of Patent: Aug. 18, 2026

(54) LIGHTING DEVICE AND KIT

(71) Applicant: H4X e.U., Graz (AT)

(72) Inventor: Andreas Hierzer, Graz (AT)

(73) Assignee: H4X E.U., Graz (AT)

( * ) Notice: Subject to any disclaimer, the term of this patent is extended or adjusted under 35 U.S.C. 154(b) by 259 days.

(21) Appl. No.: 18/586,036

(22) Filed: Feb. 23, 2024

(65) Prior Publication Data

US 2024/0288153 A1 Aug. 29, 2024

(30) Foreign Application Priority Data

Feb. 24, 2023 (DE) ......................... 102023104635.7

(51) Int. Cl.

| | |
|---|---|
| ***F21V 23/06*** | (2006.01) |
| ***F21S 2/00*** | (2016.01) |
| ***F21V 17/12*** | (2006.01) |
| ***F21V 21/005*** | (2006.01) |

(52) U.S. Cl.

CPC .............. *F21V 23/06* (2013.01); *F21S 2/005* (2013.01); *F21V 17/12* (2013.01); *F21V 21/005* (2013.01)

(58) Field of Classification Search

CPC ........ F21V 23/06; F21V 17/12; F21V 21/005; F21S 2/005

See application file for complete search history.

(56) References Cited

U.S. PATENT DOCUMENTS

| | | | | |
|---|---|---|---|---|
| 9,915,412 | B1 * | 3/2018 | Rashidi | F21S 4/28 |
| 10,801,709 | B1 * | 10/2020 | Schultz | F21V 21/36 |
| 11,815,250 | B2 | 11/2023 | Hierzer | |
| 2006/0207778 | A1 * | 9/2006 | Walter | A47B 96/1475 174/19 |

(Continued)

FOREIGN PATENT DOCUMENTS

| | | |
|---|---|---|
| DE | 29700626 U1 | 4/1997 |
| DE | 102019126924 A1 | 4/2021 |

(Continued)

OTHER PUBLICATIONS

Office Action in corresponding DE application 10 2023 104 635.7 dated Oct. 25, 2023 (1 page).

(Continued)

*Primary Examiner* — Mary Ellen Bowman

(74) *Attorney, Agent, or Firm* — Millen, White, Zelano & Branigan P.C.; William F. Nixon

(57) ABSTRACT

A lighting device includes a rail profile with a first and second area for coupling alighting unit and supplying the same. The first and second areas are each equipped with an electrical conductor means arranged essentially along a longitudinal extension direction of the rail profile and are separated from each other by a web of the rail profile. A channel is provided in the web. The lighting device comprises a first and second connector unit. One of the connector units is inserted into the first area and electrically contacted with the electrical conductor means of the first area. The other connector unit is inserted into the second area and is (Continued)

electrically contacted with its electrical conductor means. The connector units are electrically coupled to each other through the channel for the electrical coupling of the electrical conductor means of the first and second areas.

18 Claims, 8 Drawing Sheets

(56) References Cited

U.S. PATENT DOCUMENTS

| | | | | |
|---|---|---|---|---|
| 2013/0148340 | A1* | 6/2013 | Shen | F21L 4/02 362/184 |
| 2018/0172257 | A1* | 6/2018 | Hierzer | F21V 5/043 |
| 2022/0307662 | A1* | 9/2022 | Hierzer | H01R 25/142 |
| 2022/0307676 | A1* | 9/2022 | Hierzer | F21V 21/025 |

FOREIGN PATENT DOCUMENTS

| | | | |
|---|---|---|---|
| DE | 102021202975 | A1 | 9/2022 |
| EP | 3664228 | A1 | 6/2020 |

OTHER PUBLICATIONS

Office Action for Austrian Patent Application No. A 50191/2023 dated Feb. 26, 2024.

* cited by examiner

LIGHTING DEVICE AND KIT

FIELD OF THE INVENTION

The invention relates to a lighting device comprising a rail profile and a kit for use in a lighting device.

TECHNICAL BACKGROUND

Lighting devices and systems with rail profiles are widely known. Systems are also already known in which a mounting rail comprises respective areas on opposite sides for the connection of lighting units.

However, conventional lighting devices of this type are complex to set up and assemble. In order to avoid a complex, completely separate supply of the two areas, such as with electrical power, some conventional lighting devices require cumbersome, time-consuming wiring to connect the areas.

This situation needs to be improved.

SUMMARY OF THE INVENTION

Against this background, it is an objective of the invention to create a lighting device that allows for simpler and quicker assembly and reduces the effort required for an external supply of operating current, for example.

According to the invention, this objective is achieved by a lighting device with the features of claim 1 and/or by a kit with the features of claim 18.

Accordingly, a lighting device is proposed, comprising a rail profile with a first area and a second area for coupling at least one lighting unit and supplying it with electrical energy and/or with a control signal, and including a first connector unit and a second connector unit.

The first and second areas are each equipped with an electrical conductor means arranged essentially along a longitudinal extension direction of the rail profile and separated from each other by a web of the rail profile. At least one channel is provided in the web.

One of the connector units is inserted into the first area and electrically contacted with the electrical conductor means of the first area. The other connector unit is inserted into the second area and electrically contacted with the electrical conductor means of the second area. Here, the connector units are electrically coupled to each other through at least one channel of the web for the electrical coupling of the electrical conductor means of the first and second areas.

Furthermore, according to the invention, a kit is provided for use in a lighting device, comprising a rail profile with a first area and a second area for coupling at least one lighting unit and supplying it with electrical energy and/or a control signal. The first and second areas are each equipped with an electrical conductor means arranged essentially along a longitudinal extension direction of the rail profile and separated from each other by a web of the rail profile, and at least one channel is provided in the web.

The kit comprises a first and a second connector unit. The connector units are designed in such a way that

- at least one of the connector units can be inserted into the first area and can be electrically contacted with the electrical conductor means of the first area;
- at least the other of the connector units can be inserted into the second area and can be electrically contacted with the electrical conductor means of the second area; and

- the connector units can be electrically coupled to each other through at least one channel of the web for the electrical coupling of the electronic conductor means of the first and second areas.

An underlying idea of the invention is to enable the electrical coupling of the electronic conductor means of the areas with each other easily and quickly by, without much effort, connecting the two connector units into the areas in a section of the rail profile which either already comprises a prefabricated channel or into which at least one channel is introduced as needed, for example on-site. The electronic conductor means in both areas can be contacted in just a few steps, and the electronic conductor means are coupled simply and directly through at least one channel in the web. The electrical coupling may, for example, relate to an electrical operating voltage for supplying the lighting units and/or to one or more control signals, specifically for controlling the lighting units. With minimal assembly effort, only one feeder is required in one of the areas to bring in and supply the electrical energy and/or the control signal from outside. The other area of the rail profile is supplied easily and reliably using the coupled connector units. A second "feeder" is not required.

Advantageous embodiments and developments of the invention are described in the dependent claims and the description with reference to the figures.

In one embodiment, the first connector unit has at least one contact section, which electrically contacts a contacting device of the second connector unit through the channel for coupling with the second connector unit. Cumbersome wiring is thus avoided by directly contacting the connector units with each other.

In one embodiment, the contact section of the first connector unit protrudes through the channel. This makes it easier to make contact with the second connector unit.

In one embodiment, at least one projection, specifically a housing projection, of the first connector unit is arranged adjacent to the contact section of the first connector unit, wherein the projection extends into the channel and in particular protrudes through the channel. This can help to ensure the first connector unit is inserted in the correct position and also protects the contact section(s) from damage.

In one embodiment, the projection engages into an end section thereof into a recess in the second connector unit. This facilitates the correct positioning of the connector units relative to each other, which makes it easier to establish a reliable contact.

In one embodiment, at least one projection, specifically a housing projection, of the second connector unit is arranged adjacent to the contacting device of the second connector unit, wherein the projection extends into the channel and in particular protrudes through the channel. Preferably, the projection engages into an end section thereof into a recess in the first connector unit. This also simplifies the correct relative positioning and contacting of the connector units.

In one embodiment, the first connector unit has at least two contact sections. At least one channel can comprise one channel or several channels in the web. In this embodiment, the contact sections protrude through the channel or channels. Multiple contact sections, such as two or more than two, may be helpful for coupling electronic conductor means with a larger number of conductors and/or for carrying higher electrical operating currents from one electrical conductor means to another.

In one embodiment, the first connector unit has at least two, specifically at least three, contact sections, and the second connector unit has at least two, in particular at least three, contacting devices assigned to the contact sections. In this embodiment, at least one channel is provided as a shared channel for the contact sections of the first connector unit, and the contact sections each protrude through the shared channel. In this embodiment, it may in particular be sufficient to introduce a single channel into the web for the electrical coupling of the connector units.

In a further development it is provided that at least one projection of the first connector unit is arranged adjacent to at least one of the contact sections and at least one recess of the second connector unit is provided adjacent to at least one of the contacting devices associated with the contact section, wherein the projection protrudes through the channel and engages into the recess of the second connector unit. Furthermore, in this development it is provided that at least one recess of the first connector unit is provided adjacent to at least one other of the contact sections and at least one projection of the second connector unit is arranged adjacent to at least one of the contacting devices assigned to the other contact section, wherein the projection protrudes through the channel and engages into the recess of the first connector unit. This helps to correctly position the connector units relative to each other and ensures that the contact sections are brought into contact with the correct contacting devices.

In a further development, at least two of the contact sections are adjacent to a shared projection on the first connector unit, specifically surrounded by the shared projection, and a third contact section is adjacent to a recess on the first connector unit, in particular surrounded by the recess. Furthermore, in this development it is provided that at least two of the contacting devices are adjacent to a shared recess on the second connector unit, in particular surrounded by the shared recess, and a third contacting device is adjacent to a projection on the second connector unit, in particular surrounded by the projection. This means, for example, that the correct orientation of the connector units relative to each other can be recognised more easily and quickly by the installer.

In another embodiment, it is provided that at least two, in particular at least three, channels are provided in the web, the first connector unit comprising at least two, specifically at least three, contact sections and the second connector unit comprising at least two, in particular at least three, contacting devices each associated with the contact sections, wherein the contact sections of the first connector unit each protrude through an assigned one of the channels in the web. This can simplify the introduction of the channels in one aspect, especially since the size of each channel can be made smaller compared to a shared channel in this embodiment.

In a further development it is provided that at least one projection of the first connector unit is arranged adjacent to at least one of the contact sections and at least one recess of the second connector unit is provided adjacent to at least one of the contacting devices assigned to the contact section, wherein the projection protrudes through the channel assigned to the contact section and engages into the recess of the second connector unit. Furthermore, in this development it is provided that at least one recess of the first connector unit is arranged adjacent to at least one other of the contact sections and at least one projection of the second connector unit is arranged adjacent to at least one of the contacting devices assigned to the other contact section, wherein the projection protrudes through the channel associated with the other contact section and engages into the recess of the first connector unit. This in turn contributes to the correct alignment and positioning of the connector units.

In a further development, at least one projection is provided adjacent to each of two of the contact sections and at least one recess is provided on the first connector unit adjacent to a third of the contact sections. In this further development, at least one recess is provided adjacent to at least two of the contacting devices and at least one projection is provided on the second connector unit adjacent to a third of the contacting devices. In this way, the installer can also better recognise the correct alignment of the connector units to each other when inserting them.

Specifically, in further developments, each of the contact sections can comprise several, in particular three, contact elements and each of the contacting devices can comprise several, in particular three, contact elements, which can each be brought into conductive contact with one of the contact elements of the assigned contact section.

Specifically, the contact elements of the contact section can be designed to be similar to each other. Specifically, the contact elements of the contacting device can also be designed to be similar to each other.

In one embodiment, the first connector unit can comprise three contact sections, each with three contact elements, and the second connector unit can comprise three contacting devices, each with three contact elements.

In a further development, the contact elements of the contacting devices can be arranged essentially immovably on the second connector unit. Such contact elements are easy to produce and save space, for example as flat contact areas.

In a further development, the contact elements of the contact sections of the first connector unit are preferably designed to be flexible, particularly resiliently movable. This allows, for example in combination with immovable contact elements of the second connector unit, good contact through contact under spring force and a certain degree of tolerance compensation.

In one embodiment, a mechanical connecting element, in particular a screw, is guided from one of the connector units, for example the first connector unit, through the channel or through an additional access opening in the web of the rail profile and engages in a receiving area of the other connector unit, for example the second connector unit, a. For example, the anchoring element can be screwed into the receiving area. In this way, the connector units can be reliably prevented from becoming detached from the rail profile and from each other.

In one embodiment, the first area and the second area are each equipped with the electrical conductor means in the same way. This allows the use of lighting units with identically designed mechanical and electrical interfaces for coupling with the rail profile, thus enabling flexible use.

In a further embodiment, each of the first and second connector units can alternatively be inserted into the first or second area. This further simplifies the installation of the lighting device.

In one embodiment, conductors of the electrical conductor means of both the first and second areas are arranged laterally to the respective connector unit used. Specifically, conductors can be provided on both sides of the respective connector unit used. The conductors can therefore be stored in a space-saving manner.

In one embodiment, the electrical conductor means of the first and second areas each have conductors for providing electrical operating voltage and a control signal. The electrical coupling of the electrical conductor means of the first and second areas to each other by means of the connector units can in particular include a coupling of conductors of the first and second electrical conductor means to provide the operating voltage and a coupling of conductors of the first and second electrical conductor means to provide the control signal.

The control signal can in particular be a DALI signal. However, the use of other types of control signals is also conceivable.

In one embodiment, the electrical conductor means are configured to provide a low voltage, for example of approximately 48 volts, as the operating voltage. A lighting device with a low-voltage rail can thus be created.

For example, the electrical conductor means can be designed to provide a direct current as the operating voltage.

In another embodiment, the electrical conductor means are configured to provide a high voltage, in particular mains voltage, as the operating voltage, for example a nominal voltage in the range of approximately 220 to 230 volts. A lighting device with a high-voltage rail can thus be created.

For example, the electrical conductor means can be designed to provide an alternating current as the operating voltage, for example at approximately 220 to 230 volts nominal voltage and with a frequency in the range of approximately 50 Hz.

The first and second areas of the track profile can in particular be formed on opposite sides thereof. This can, for example, enable the appropriate provision of direct and indirect lighting.

In one embodiment, the track profile is designed with a cross section that is essentially H-shaped as a whole or at least in certain areas. The first and second areas can be easily accommodated in such a track profile, particularly on opposite sides of the track profile. Specifically, lateral flanges of the track profile connected by the web can be designed to be straight or formed as a curve or at least in certain areas in the cross section.

In one embodiment, a housing of the first connector unit and a housing of the second connector unit are each formed with a height, viewed along a depth direction of the first or second area, in a range of approximately 8 mm to approximately 10 mm, in particular approximately 9 mm.

Furthermore, in a further development, the first connector unit can be designed with a height including the contact sections, viewed along the depth direction of the first area, in a range of approximately 12 mm to approximately 15 mm, for example approximately 13 mm to approximately 14 mm.

In one embodiment, the housing of the first connector unit and the housing of the second connector unit can each, apart from elastically projecting elements, be designed with a width, viewed transversely to the depth direction, in a range of approximately 10 mm to approximately 12 mm, in particular approximately 11 mm.

In one embodiment, the first and second connector units can each be designed with a length, viewed along the longitudinal extension direction of the track profile, in a range of approximately 70 mm to approximately 90 mm, in particular approximately 80 mm.

It goes without saying that the embodiments and developments described above can be applied in an analogous manner to both the lighting device and the kit.

BRIEF DESCRIPTION OF THE DRAWINGS

The invention is explained in more detail below using the exemplary embodiments shown in the figures of the drawings. The following are depicted.

The accompanying drawings are provided to clarify the embodiments of the invention. They illustrate the embodiments and, together with the description, serve to explain the principles and concepts of the invention. Other embodiments and many of the mentioned advantages will become apparent when consulting the drawings. The elements of the drawings are not necessarily shown at the same scale.

In the figures, elements, features and components which are identical, and which have the same function and effect each have the same reference signs, unless otherwise stated.

DESCRIPTION OF EMBODIMENTS OF THE INVENTION

Figure 11:
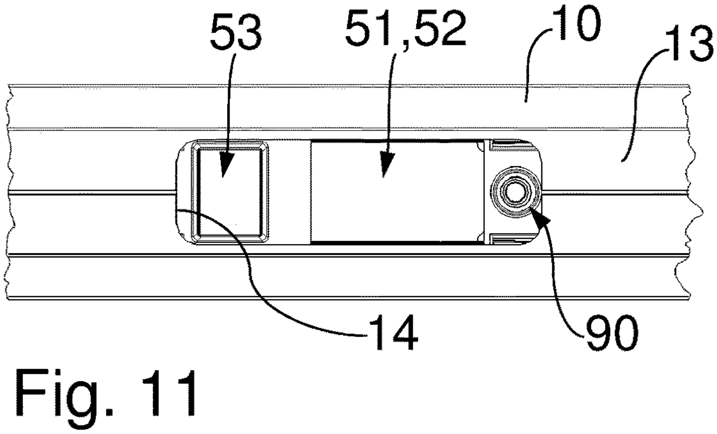
FIG. 11 a top view of a section of the track profile similar to FIG. 5, wherein the second connector unit of FIG. 2 is inserted, and the first connector unit is still omitted.
Figure 12:
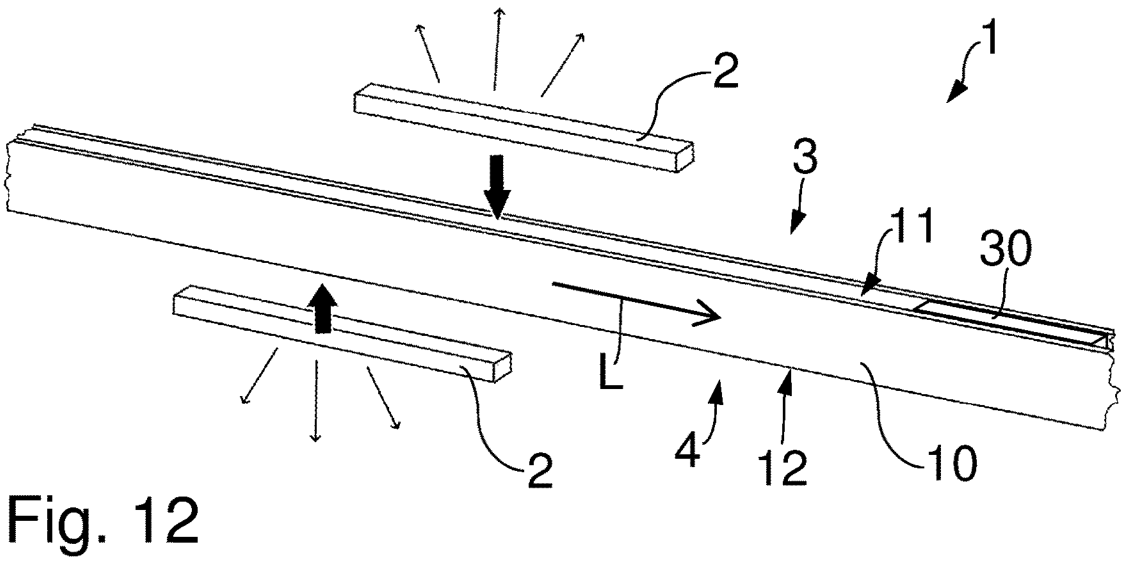
FIG. 12 a section of a lighting device according to the first exemplary embodiment during the insertion of lighting units into the track profile, in perspective.
Figure 13:
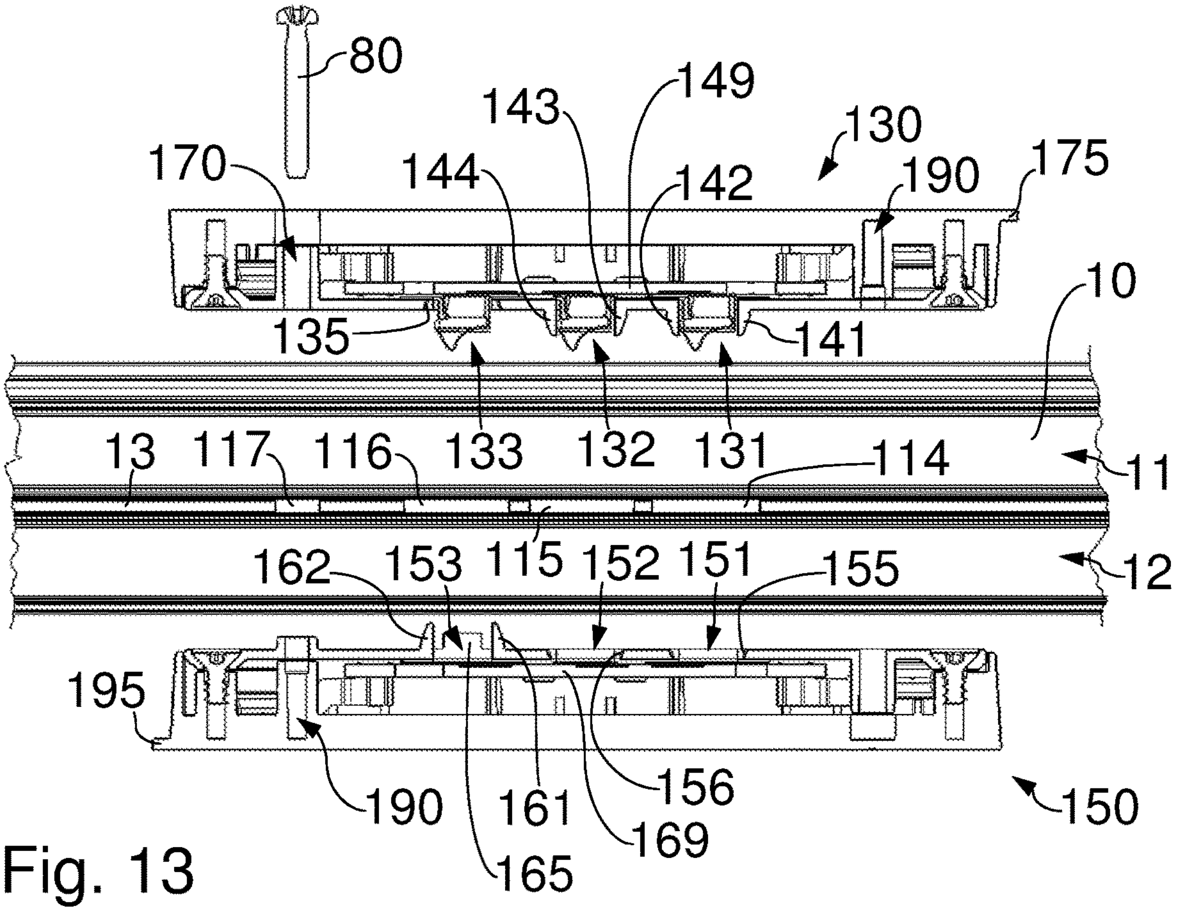
FIG. 13 first and second connector units being inserted into a track profile to create a lighting device according to a second exemplary embodiment, in a longitudinal section.
Figure 14:
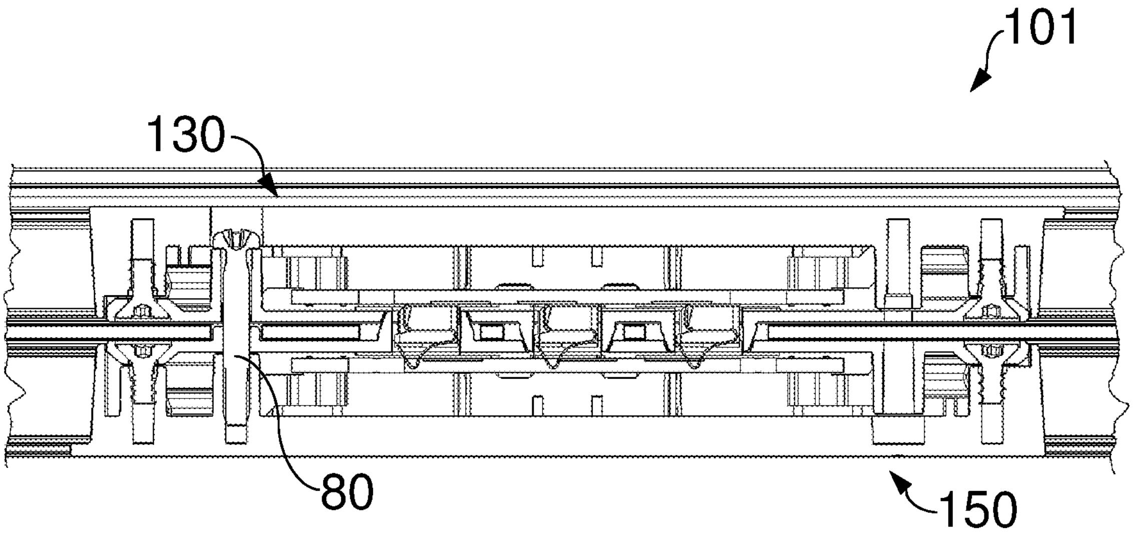
FIG. 14 the connector units and the track profile from FIG. 13 after inserting the connector units, in longitudinal section.
Figure 15:
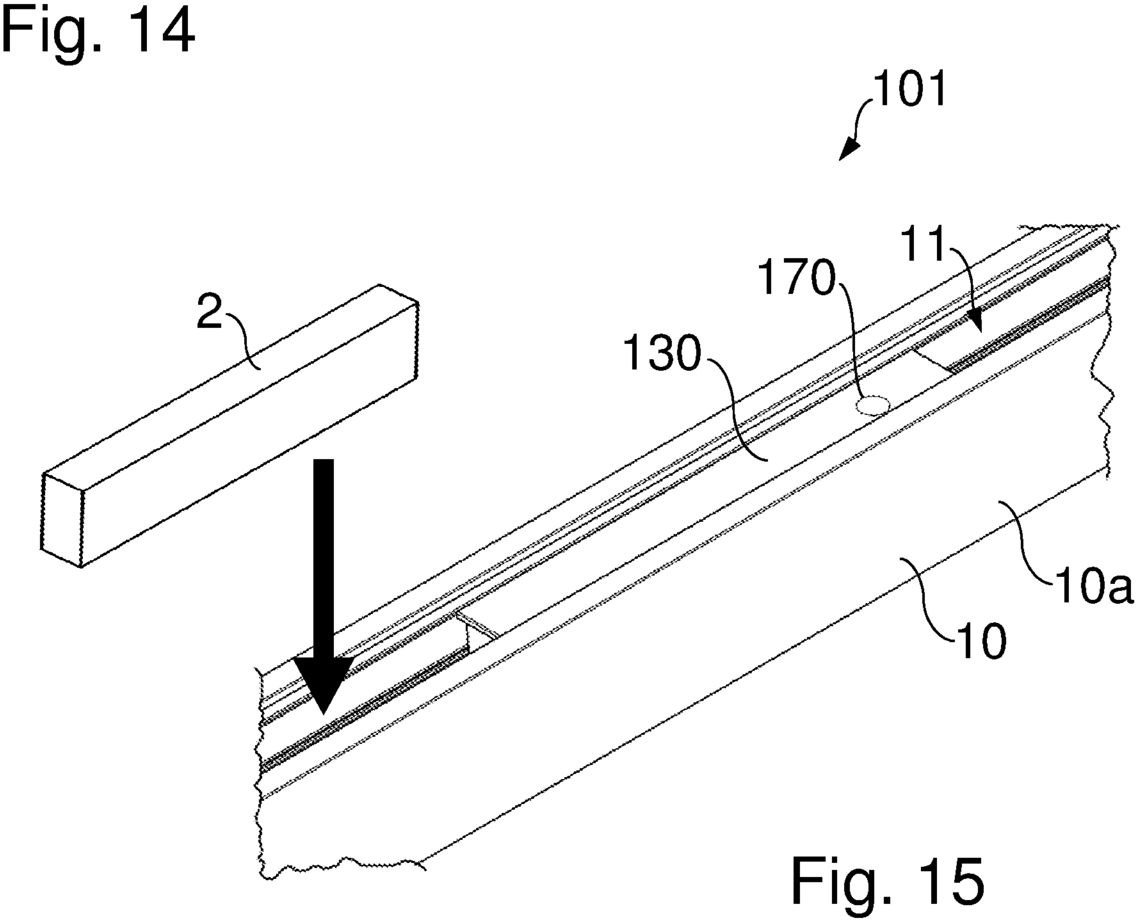
FIG. 15 a section of a lighting device according to the second exemplary embodiment, when inserting a lighting unit, in perspective.
Figure 16:
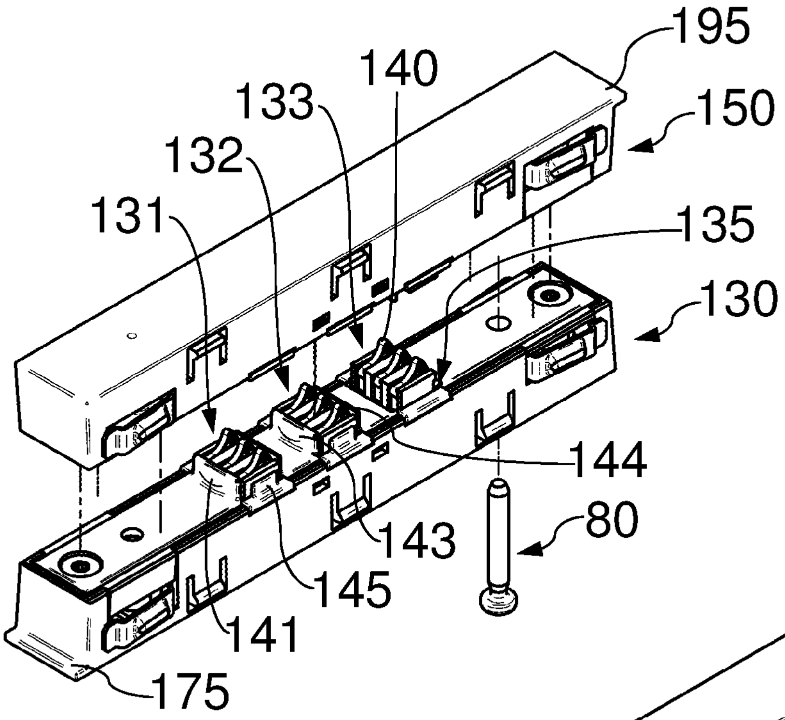
FIG. 16 the first and second connector units according to the second exemplary embodiment, positioned relative to each other in a suitable manner for coupling, in perspective.
Figure 17:
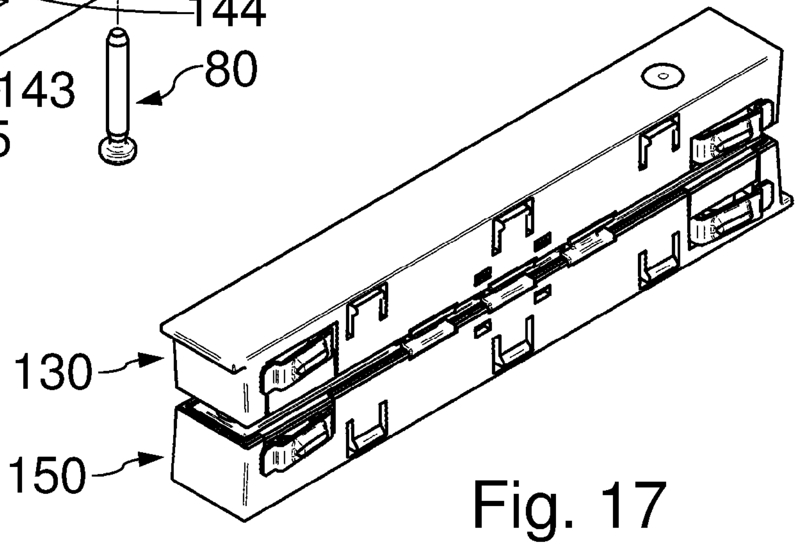
FIG. 17 the connector units of FIG. 16 after coupling, in a perspective view without the track profile for illustration.

A lighting device 1 according to a first exemplary embodiment is shown in FIG. 12. Components and details of the device 1 are shown in FIGS. 1-11. The lighting device 1 has a track profile 10 with a longitudinal extension direction L, which is designed on an upper side 3 and on a lower side 4 opposite the upper side 3 for the coupling of lighting units 2. FIG. 12 shows schematically an insertion of the lighting units 2 into a first area 11 of the track profile 10 on the upper side 3 and into a second area 12 of the track profile 10 on the lower side 4. The units 2 emit light as light inserts during operation.

The lighting device 1 can be used, for example, as a suspended lighting device, wherein the first area 11 is oriented upwards and the second area 12 downwards, as in FIG. 12. Lighting units 2 inserted into the area 11 can be used for indirect lighting, for example on a horizontally suspended track 10, while lighting units 2 used in the area 12 can be used for direct lighting.

Alternatively, the lighting device 1 can be arranged upright or standing, for example vertically or obliquely, in the manner of a column. In this case, lighting units 2 inserted into the areas 11, 12 radiate laterally from the column-like lighting device 1.

Figure 8:
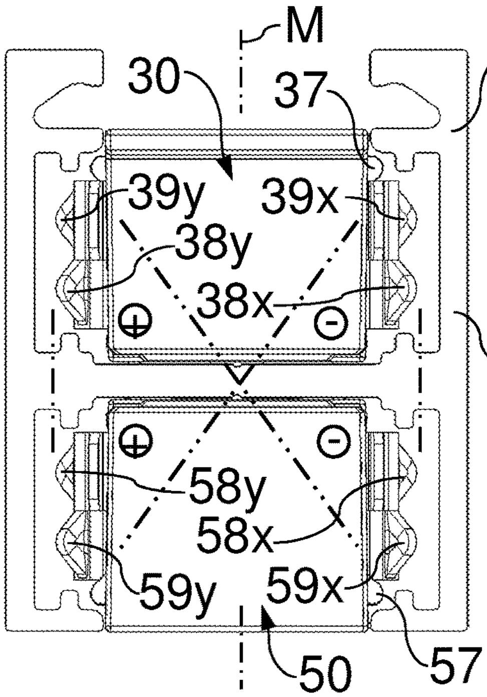
FIG. 8 a cross-sectional view of the track profile of FIG. 5 with the inserted and coupled connector units of FIGS. 1 and 2, wherein the electrical conductor means of the track profile are not shown for better clarity.
Figure 9:
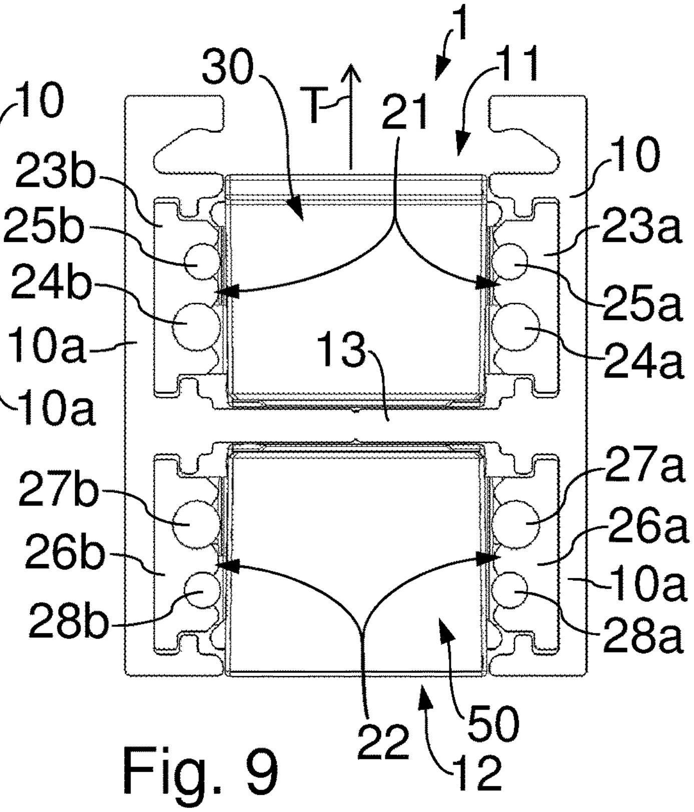
FIG. 9 a cross-sectional view similar to FIG. 8, wherein the electrical conductor means of the track profile are shown.
Figure 10:
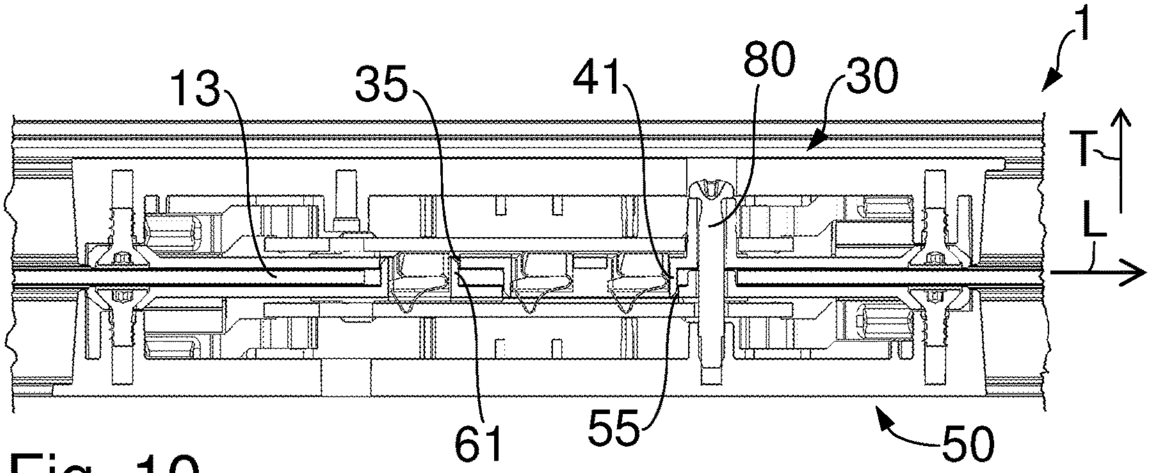
FIG. 10 the track profile of FIG. 5 with the inserted and coupled connector units of FIGS. 1 and 2 in a longitudinal section.

The rail profile 10 is designed with an essentially H-shaped cross section, see FIGS. 8-9. The first area 11 and the second area 12 are shaped essentially in the same way, in particular with regard to the space intended to accommodate the lighting units 2, and are each equipped in essentially the same way with an electrical conductor means 21 or 22, wherein each of the electrical conductor means 21, 22 extends along the longitudinal extension direction L. Each of the areas 11, 12 is used to couple the lighting units 2 and to supply them with electrical energy for their operation, as well as to supply the lighting units 2 with a control signal, specifically a DALI signal.

The rail profile 10 is essentially formed symmetrical to a longitudinal centre plane M of the rail profile 10. The areas 11 and 12 are separated from each other by a web 13 of the profile 10 and are largely isolated from each other. The web 13 connects lateral flanges 10*a* of the rail profile 10 to each other, wherein the flanges 10*a* extend essentially straight in the longitudinal extension direction that runs normal to the longitudinal direction L.

The electrical conductor means 21, 22 are each designed in two parts, and each have two insulating holding bodies 23*a*, 23*b* and 26*a*, 26*b* extending in the direction L, see FIG. 9. Each holding body 23*a*, 23*b* accommodates two conductors, a conductor 24*a* or 24*b* for providing the operating voltage and a conductor 25*a* or 25*b* for providing the control signal. Each holding body 26*a*, 26*b* accommodates two conductors, a conductor 27*a* or 27*b* for providing the operating voltage and a conductor 28*a* or 28*b* for providing the control signal. The holding bodies 23*a*, 23*b* and 26*a*, 26*b* with the conductors 24*a-b*, 25*a-b*, 27*a-b*, 28*a-b* accommodated therein are arranged and held in the area 11 and 12 on both sides along lateral inner walls of the lateral flanges 10*a* of the profile 10.

The conductors 24*a, b*, 27*a, b* are designed in the first exemplary embodiment to provide a low voltage of, for example, approximately 48 volts of direct current. In a variant, the conductors 24*a-b*, 27*a-b* could be designed and accommodated for a higher voltage, for example in order to supply the lighting units 2 with mains voltage, such as an alternating current at 230 V nominal voltage and a frequency of 50 Hz.

Advantageously, in the lighting device 1, only the conductors 24*a*, 24*b*, 25*a*, 25*b* or 27*a*, 27*b*, 28*a*, 28*b* of one of the electrical conductors means 21 or 22 are fed with operating voltage and the control signal from an external source. This can be achieved using a "power feeder" unit or feed unit (not illustrated), which can be implemented, for example in a section of the first area 11 by introducing power into the electrical conductor means 21. The electrical conductor means of the other area, such as the electrical conductor means 22, is supplied by means of two interconnected connector units 30 and 50. For this purpose, one of the connector units 30, 50 is inserted into the first area 11 and the other into the second area 12. This takes place in a section of the rail profile 10 in which the web 13 is provided with a channel 14.

The operating voltage conductors 24*a, b*, 27*a, b* are arranged internally, relative to the outer openings of the areas 11, 12, towards the web 13. In area 11, the operating voltage conductors 24*a*, 24*b* and control signal conductors 25*a*, 25*b* are each arranged opposite each other across the longitudinal centre plane M. The conductors 27*a*, 27*b* and 28*a*, 28*b* are arranged in a similar way in the second area 12.

Figure 5:
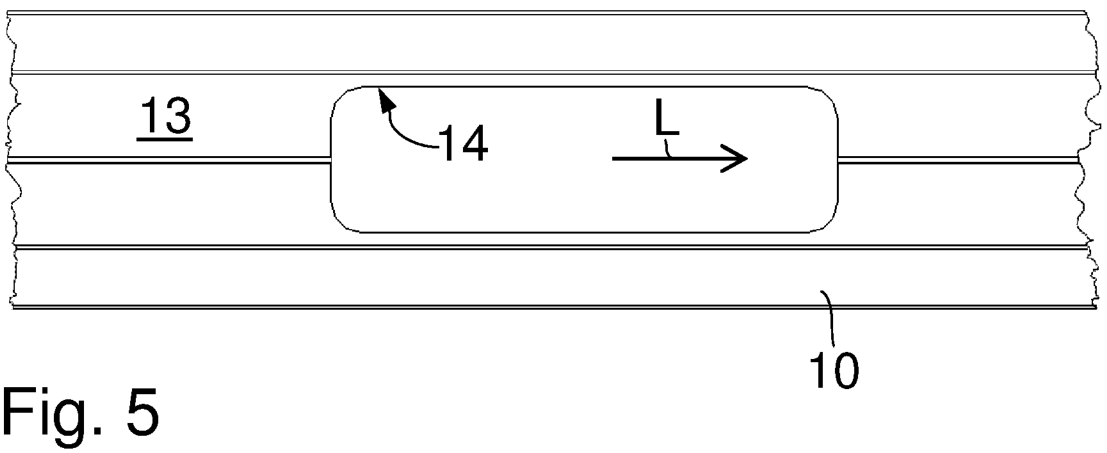
FIG. 5 a section of a rail profile with a channel for a lighting device according to the first exemplary embodiment, in top view.
Figure 6:
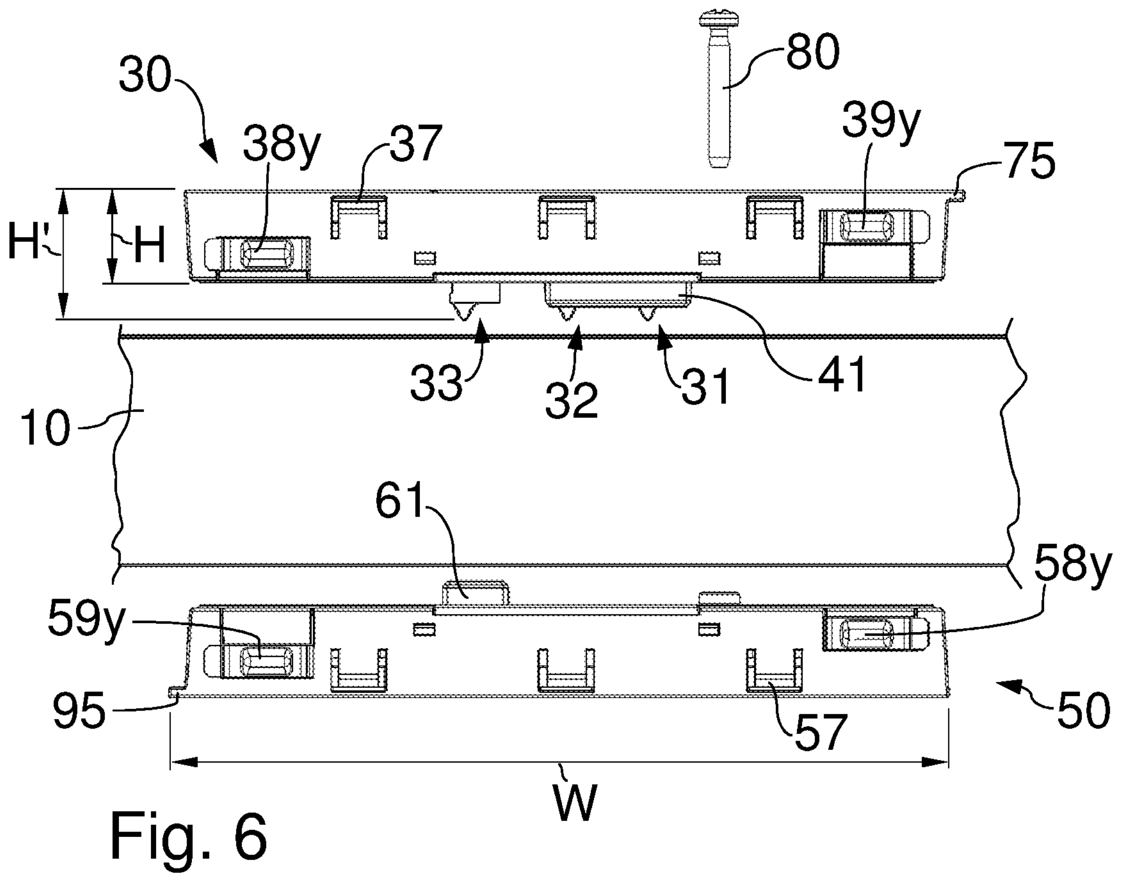
FIG. 6 the connector units of FIGS. 1 and 2 when inserted into the track profile of FIG. 5, in side view.
Figure 7:
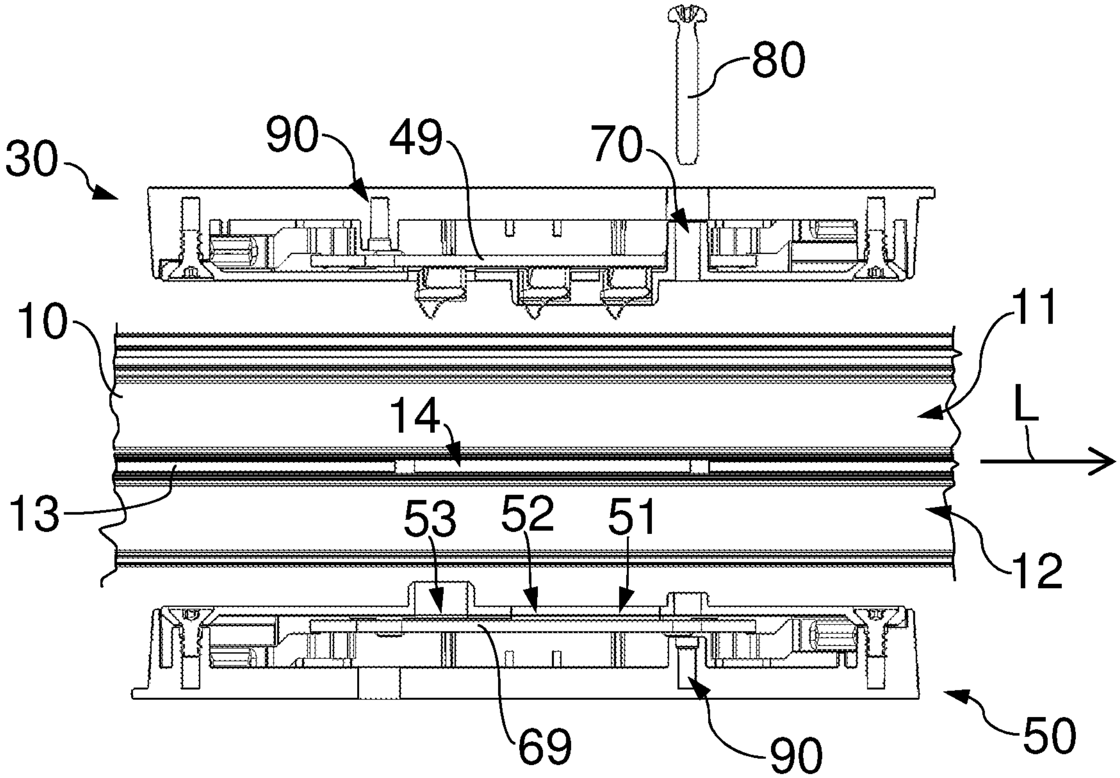
FIG. 7 the situation shown in FIG. 6 in a longitudinal section.

In the first exemplary embodiment, the channel 14 is rectangular with rounded corners and can be introduced into the web 13, for example by milling or sawing, see FIG. 5. The channel 14 can either be prefabricated or introduced on-site at a selected position. The on-site creation of the channel 14 during on-site assembly increases the flexibility when positioning the connector units 30, 50 according to the requirements.

In FIGS. 6-12, the first connector unit 30 is inserted into the first area 11 and electrically contacted with the electrical conductor means 21 of the area 11, while the second connector unit 50 is inserted into the second area 12 and electrically contacted with the electrical conductor means 22 of the area 12. However, a reversed insertion with unit 30 in area 12 and unit 50 in area 11 is equally possible.

In order to electrically couple the electrical conductor means 21 and 22 to each other and to provide electrical energy and the control signal in both areas 11, 12, while simultaneously saving a second external feed, for example using a further "power feeder", the connector units 30 and 50 are electrically coupled to each other through the channel 14.

For this purpose, the first connector unit 30 has three contact sections 31, 32, 33 on a side facing the web 13 when inserted, which protrude together through the channel 14 after the unit 30 has been inserted. Each contact section 31, 32, 33 is provided with three similar, flexibly resilient contact elements 40 or spring contacts. The contact sections 31, 32, 33 can, for example, be arranged and fastened on a printed circuit board 49.

A projection 41 is provided on the first connector unit 30 adjacent to the contact sections 31, 32, wherein the projection 41 is in particular formed on a housing component of the first connector unit 30. The projection 41 surrounds the two contact sections 31, 32 as a circumferentially closed wall. A recess 35 is provided on the first connector unit 30 adjacent to the contact section 33, wherein the contact section 33 is circumferentially surrounded by the recess 35. The recess 35 can be an opening in the housing wall through which the contact section 33 projects and largely fills this opening, leaving a free space around the contact section 33.

The second connector unit 50 has three contacting devices 51, 52, 53 on a side facing the web 13 when inserted, which are accessible through the channel 14 after the connector unit 50 has been inserted, see also FIG. 11. Each contacting device 51, 52, 53 has three similar contact elements 60, each of which can be brought into conductive contact with one of the contact elements 40 of an assigned contact section 31, 32 and 33 in the manner described below. The contact elements 60 are arranged as flat, essentially immovable elements on the second connector unit 50, for example on a printed circuit board 69.

The contacting device 51 is assigned to the contact section 31, the contacting device 52 to the contact section 32 and the contacting device 53 to the contact section 33.

The second connector unit 50 has a recess 55 adjacent to the contacting devices 51, 52, which surrounds the contacting devices 51, 52. The recess 55 is designed as an opening in a housing wall of the unit 50, through which the contacting devices 51, 52 are accessible. A projection 61 is provided on the second connector unit 50 adjacent to the contacting device 53, wherein the projection 61 is in particular formed on a housing component of the second connector unit 50. The projection 61 surrounds the contact section 53 as a circumferentially closed wall.

After insertion of the units 30, 50 into the rail profile 10, the contact sections 31, 32, 33 protrude through the channel 14. At the same time, the projection 41 projects through the channel 14 and engages into an end section in the recess 55 of the second connector unit 50, while the projection 61 also projects through the channel 14 and engages into an end portion in the recess 35 of the first connector unit 30. The end portions of the projections 41, 61 are provided with externally bevelled end edges 41*a*, 61*a* to facilitate insertion into the recesses 55 and 35, respectively.

After the connector unit 30 has been completely inserted into the first area 11 and the connector unit 50 into the second area 12, the contact elements 40 of the sections 31-33 each make contact with the contact elements 60 of the devices 51-53 assigned to them. The resilient design of the contact elements 40 enables good contact by through application under spring force.

FIGS. 8, 9 show that the conductors 24*a-b*, 25*a-b* are arranged on the side of the inserted connector unit 30, and the conductors 27*a-b*, 28*a-b* are arranged on the side of the inserted connector unit 50.

The connector units 30, 50 have lateral, spring-loaded contact elements 38*x*, 38*y* or 58*x*, 58*y* for making contact with the operating current conductors 24*a, b* or 27*a, b*. Furthermore, the connector units 30, 50 have lateral, spring-loaded contact elements 39*x*, 39*y* or 59*x*, 59*y* for making contact with the control signal conductors 25*a, b*, 28*a, b*. When inserted as spring contacts, the lateral contact elements 38*x*, 38*y*, 39*x*, 39*y* or 58*x*, 58*y*, 59*x*, 59*y* come into electrically conductive contact with the respective assigned conductor in an elastically resilient manner.

Using the contact elements 38*x*, 38*y*, 39*x*, 39*y*, the first connector unit 30 can receive operating current and control signals from the electrical conductor means 21 along the area 11. Using the contact elements 58*x*, 58*y*, 59*x*, 59*y*, the second connector unit 50 is able to deliver the operating current and the control signals to the electrical conductor means 22 along the area 12. It is understood that alternatively, the power feed can take place in the second area 12, so that the reception and distribution of operating current and control signals then take place in the reverse manner as just described.

The connector units 30 and 50 are each mechanically clipped into the rail profile 10 in a latching manner. For this purpose, each unit 30, 50 has, in the area of its two outer side surfaces, latching devices 37 and 57 in the form of elastically yielding housing wall sections with latching lugs arranged thereon, wherein the latching lugs engage behind inner edges of internal longitudinal ribs of the track profile when the units 30, 50 are inserted into the area 11 or 12. The latching devices 37 and 57 thus serve as retaining clips. A tool is not required to engage the units 30, 50 and to release them from the area 11 or 12. A grip bar 75 on a narrow side of the first unit 30 and a grip bar 95 on a narrow side of the second unit 50 make it easier to remove them from the rail profile 10 if required.

In order to secure the connector units 30, 50 against unintended release from the track profile 10, in addition to their latching, the first connector unit 30 features a round access opening 70 through which a screw 80 as a mechanical connecting element is guided from the first connector unit 30 through the channel 14 and screwed into a receiving area 90 of the second connector unit 50. An additional safeguard against detachment of the units 30, 50 from each other and from the areas 11, 12 is thus accomplished by using the screw 80.

In the first exemplary embodiment, the shared channel 14 is designed for the contact sections 31, 32, 33, the projections 41, 61 and the screw 80.

The connector units 30 and 50 are part of a kit that is used in the lighting device 1 to electrically couple the two areas 11 and 12.

Thus, for example, the electrical conductor means 22 of the second area 12 can be supplied with operating current and control signals via the first area 11 by inserting a connector unit 30, 50 into both areas 11, 12 at a location with the recess or access opening 14. The avoidance of a second "power feeder", reduces the material requirements and, in particular, simplifies the assembly and reduces wiring complexity. The units 30, 50 are easily and correctly positioned, for example clipped in separately and, if necessary, additionally mechanically connected using the screw 80.

Figure 1:
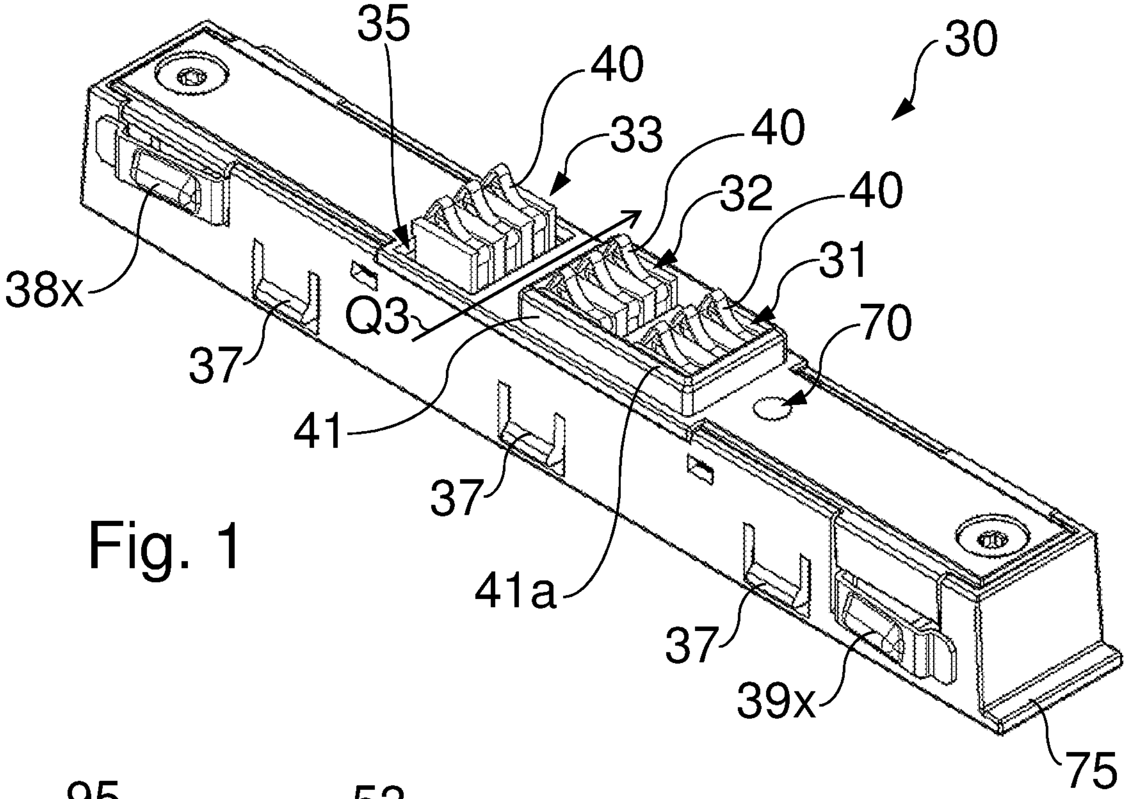
FIG. 1 a first connector unit according to a first exemplary embodiment.
Figure 2:
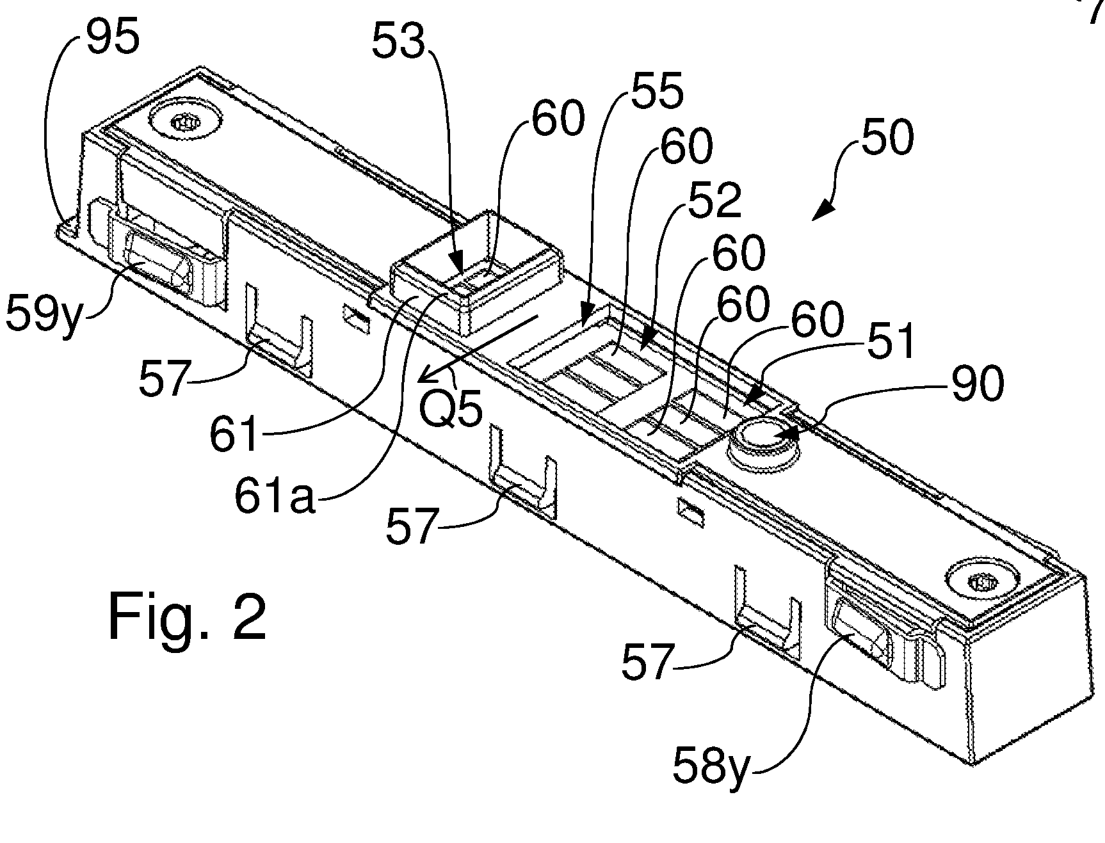
FIG. 2 a second connector unit according to the first exemplary embodiment.
Figure 3:
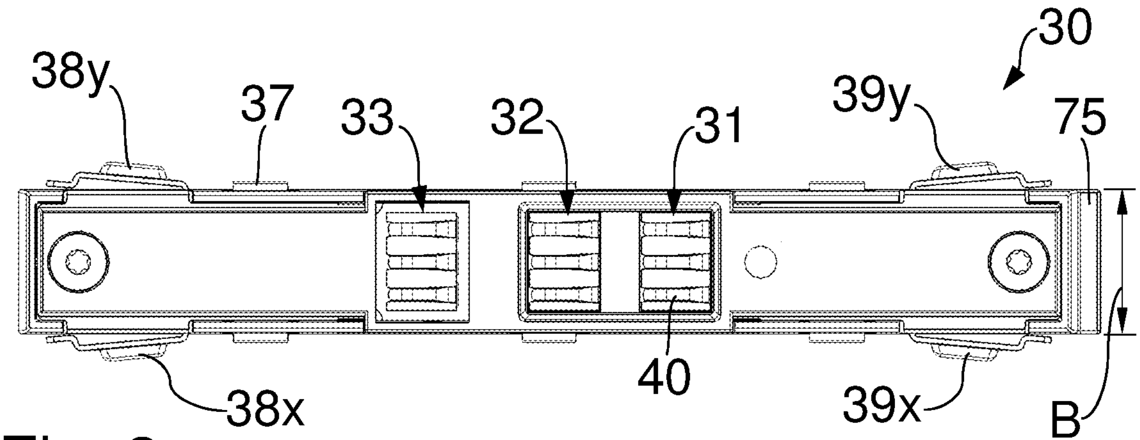
FIG. 3 the first connector unit of FIG. 1 in top view.
Figure 4:
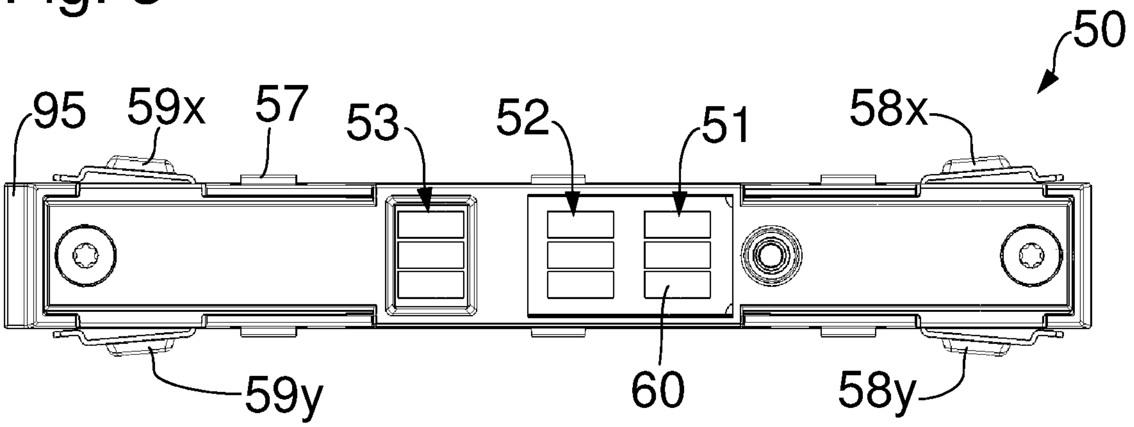
FIG. 4 the second connector unit of FIG. 2 in top view.

After inserting the units 30, 50 into the areas 11, 12, the contact sections 31, 32, 33 and contacting devices 51, 52, 53 are each arranged one after the other along the longitudinal extension direction L, whereas the three contact elements 40 of each contact section 31-33 and the three contact elements 60 of each contacting device 51-53 are arranged transversely to the longitudinal extension direction L and arranged here in a transverse direction Q3 of the unit 30 or in a transverse direction Q5 of the unit 50, see FIGS. 1-2.

Seen in the transverse direction Q3, the first contact element 40 of each of the three contact sections 31, 32 and 33 and the first contact elements 60 of each of the three contacting devices 51, 52, 53, which are assigned to these three contact elements 40 and viewed in the transverse direction Q5, are used for the transmission of operating current in the first exemplary embodiment. Furthermore, viewed in the transverse direction Q3, the third contact element 40 of each of the three contact sections 31, 32, 33 and the third contact elements 60 of each of the three contacting devices 51, 52, 53, which are assigned to these three contact elements 40 and viewed in the transverse direction Q5, are also used for the transmission of the operating current in the first exemplary embodiment. Herein, of the six contact elements 40 thus designated for the transmission of the operating current, three are collectively assigned to one of the conductors 24*a*, 24*b* and thus, for example, to one pole, while the other three are collectively assigned to the other of the conductors 24*a*, 24*b* and thus, for example, to the other pole. The same applies to the assignment of the conductors 27*a, b* or poles to the contact elements 60. The transmission takes place via three individual contact elements 40, 60 in order to be able to expediently realise the desired current intensities.

The middle contact element 40 of the contact section 31 in the direction Q3 and the middle contact element 60 of the assigned contacting device 51 in the direction Q5, as well as the middle contact element 40 of the contact section 33 in the direction Q3 and the middle contact element 60 of the assigned contacting device 53 in the direction Q5 are used to transmit the control signal, specifically the DALI control signal. Here, the middle contact element 40 of the section 32 in the direction Q3 and the middle contact element 60 of the device 52 in the direction Q5 can remain unused or are still available for another use.

Thus, the contact elements 40 of the contact sections 31 and 33 that follow each other in the transverse direction Q3 are each assigned as follows: Operating current-control signal-operating current. Furthermore, the contact elements 40 of the contact section 32 that follow each other in the transverse direction Q3 are assigned as follows: Operating current-no conductor-operating current. The same applies to the contact elements 60 in the transverse direction Q5.

FIGS. 8 and 9 illustrate that the lateral contact elements 24*a,b*, 25*a,b* are assigned to and electrically coupled with the contact elements 40, and the lateral contact elements 27*a,b*, 28*a,b* are assigned to and electrically coupled with the contact elements 60 inside the units 30 and 50, respectively in such a way that when both units 30, 50 are inserted and electrically contacted through the channel 14, the conductors of the conductor devices 21 and 22 are coupled as follows: conductor 24*a* with conductor 27*a*, for example to guide the negative pole of the operating power supply; conductor 24*b* with conductor 27*b*, for example to guide the positive pole of the operating power supply; conductor 25*a* with conductor 28*b*, and conductor 25*b* with conductor 28*a*, for the control signal, for example according to the DALI protocol. As shown schematically in FIG. 8 with a double-dotted line, the control signal conductors in this example are cross-coupled across the longitudinal centre plane M, while the operating current conductors are coupled on their respective sides of the longitudinal centre plane M without crossing, However, in variants, the control signal conductors could alternatively be coupled across plane M without crossing over.

The direct electrical contacting of the units 30, 50 across the dividing plane of the web 13 using the contact elements 40 of the sections 31-33 and the contact elements 60 of the devices 51-53 advantageously makes cabling unnecessary.

Except for the area of the contact sections 31-33 and contacting devices 51-53 and an access opening 70 that is missing or sealed in the unit 50, the housings of the units 30 and 50 are essentially designed with the same external shape. A width B of the housing transverse to a depth direction T of the areas 11, 12 is, with the exception of the elements 38*x*, 38*y*, 39*x*, 39*y*, 37 or 58*x*, 58*y*, 59*x*, 59*y*, 57, approximately 10 mm to approximately 12 mm, for example approximately 11 mm.

A height H of the housing of the first and second connector units 30, 50 is approximately 8 mm to approximately 10 mm, in particular approximately 9 mm, along the depth direction T, wherein the projections 41, 61 and the contact sections 31-33 are excluded from this measurement. In the case of the first connector unit 50, its height H' including the contact sections 31-33 along the depth direction T is approximately 12 mm to approximately 15 mm, for example about 13 mm to about 14 mm.

A length W of the first and second connector units 30, 50 can be approximately 70 mm to approximately 90 mm, for example approximately 80 mm, after insertion into the profile 10, viewed along the longitudinal extension direction L of the rail profile 10.

Figure 18:
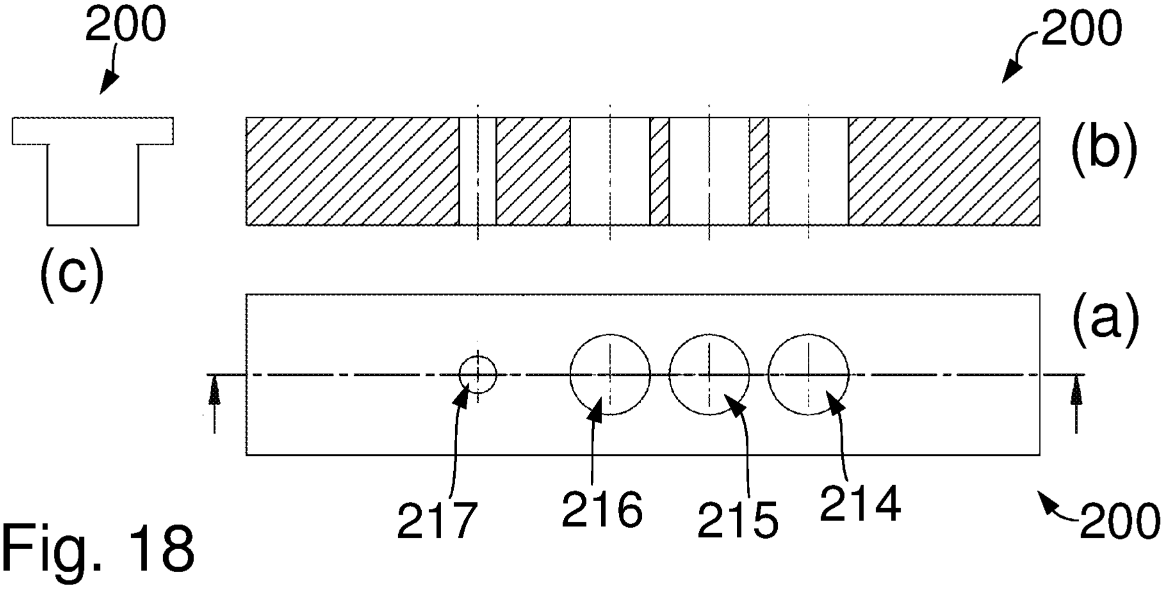
FIG. 18 a drilling template for use when forming the lighting device of the second exemplary embodiment, in top view (a), in a longitudinal centre section (b) and in an end face view (c)

A lighting device 101 according to a second exemplary embodiment and components thereof are shown in FIGS. 13-17. FIG. 18 illustrates a drilling template 200 for use when assembling the lighting device 101.

The differences between the lighting device 101 and the lighting device 1 described in detail above will be shown below. In addition, reference is made to the embodiments above regarding the first exemplary embodiment.

The lighting device 101 comprises a rail profile 10, which is designed as described above for the first exemplary embodiment and is equipped with an electrical conductor means 21, 22, but differs with regard to the channel 14. The lighting device 101 also comprises first and second connector units 130, 150, which are designed in terms of their external housing shape as in the first exemplary embodiment and, as in the first exemplary embodiment, are provided with lateral contact elements and lateral latching devices and grip bars 175 and 195, respectively.

In the lighting device 101, three equally sized, circular channels 114, 115 and 116 are introduced one after the other into the web 13 in the longitudinal extension direction L of the profile 10, but separately from each other. The centres of the circular openings 114, 115, 116 each lie on a straight line parallel to the longitudinal extension direction L of the rail profile 10 in the middle of the web 13. The channel 116 is followed by a smaller, additional access opening 117, the centre of which also lies on the straight line mentioned.

The channels 114, 115, 116 and 117 can be easily and conveniently incorporated into the web 13 by drilling into the web 13 at a selectable position along the rail profile 10 when assembling the lighting device 101 on-site. This is made easier, for example, by the drilling template 200 shown in FIG. 18, which has guide holes 214, 215, 216, and 217 arranged respectively in a straight line for the channels 114, 115, 116, and 117. The drilling template 200 is inserted into one of the areas 11 or 12, the channels 114-117 created as holes and the drilling template 200 is then removed.

The first connector unit 130 has three contact sections 131, 132 and 133, which are designed similarly to the contact sections 31-33. After insertion of the unit 130, for example, into the first area 11, the contact section 131 protrudes through the channel 114 assigned to it, the contact section 132 through the channel 115 assigned to it and the contact section 133 through the channel 116 assigned to it.

The contact sections 131, 132, 133 are assigned three contacting devices 151, 152, 153 of the second connector unit 150, which are positioned in such a way that after inserting the unit 150, for example into the second area 12, the contacting device 151 passes through the channel 114, the contacting device 152 is accessible through the channel 115 and the contacting device 153 through the channel 116.

The contact sections 131-133 are arranged on a board 149 of the first connector unit 130 and are formed with resilient contact elements 140, while the contacting devices 151-153 are formed with essentially immovable, flat contact elements on a circuit board 169 of the second connector unit 150, as described for the first exemplary embodiment. For example, the contact elements of sections 131-133 and devices 151-153 can be occupied as described for the first exemplary embodiment.

Adjacent to the contact section 131, projections 141 and 142 are arranged on the first connector unit 130 on both sides of the same, after inserting the unit 130 into the profile 10 as seen in the direction L at the front and back. The projections 141, 142 are designed, for example, as housing projections of the unit 130 and are bevelled on the outside at the free end sections. In an analogous manner, projections 143 and 144 are formed adjacent to the contact section 132, see for example FIGS. 13 and 16.

A recess 135 is provided adjacent to the third contact section 133, which in turn is formed by a housing opening of the first unit 130, through which the contact section 133 extends. In this way, at least on both sides of section 133, seen in the longitudinal extension direction L from the front and back after inserting the unit 130, a part of the recess 135 is formed on the first connector unit 130.

Adjacent to the contacting device 153 on both sides thereof, seen from the front and back in the longitudinal extension direction L after inserting the unit 150 into the profile 10, projections 161 and 162 are arranged on the second connector unit 130.

These projections, for example, are formed as housing projections of the unit 150 and are chamfered on the free end sections on the outside.

A recess 155, 156 is provided on the second connector unit 150 adjacent to each of the two contacting devices 151 and 152, wherein the recesses 155 and 156 can each be designed as a housing opening which surrounds the contacting device 151 and 152 and through which the contacting device 151 or 152 is accessible.

The contacting device 151 is assigned to the contact section 131, the contacting device 152 to the contact section 132 and the contacting device 153 to the contact section 133.

After inserting the first connector unit 130, for example, into the first area 11 and inserting the second connector unit 150 into the second area 12, the contacting devices 131, 132 and 133 protrude through the channels 114, 115, 116. At the same time, the projections 141, 142 protrude through the channel 114 and engage with their end sections in the parts of the recess 155 on both sides of the device 151, the projections 143, 144 protrude through the channel 115 and engage with their end sections in the parts of the recess 156 on both sides of the device 152, and the projections 161, 162 protrude through the channel 117 and engage with their end sections in the parts of the recess 135 on both sides of the section 133.

Accordingly, near the two consecutive contact sections 131 and 132 projections 141-144 are provided, which originate from the first connector unit 130 and extend through the channels 114, 115, while near the contacting device 153, the projections 161, 162 are provided, originating from the second connector unit 150 and extending through the channel 116. This achieves alignment and centring of the units 130, 150 relative to each other and to the rail profile 10. By arranging the two contact sections 131 and 132, equipped with adjacent projections 141-144, in sequence within the layout of the three sections 131-133, and having a single terminal section 133 equipped with the adjacent recess 135, along with a corresponding arrangement for devices 151-153, the configuration of contact sections 131-133 and devices 151-153 is asymmetrical, whereby design allows for electrical coupling only with a specific alignment of the units 130, 150 relative to each other.

Adjacent to the contact sections 131 and 132, and adjacent to the contacting device 153, additional lateral projections 145, 165, which are shorter than the projections 141-144 and for improved lateral guidance of the connector units, can be provided essentially parallel to the longitudinal edges of the connector unit 130 or 150, 130 and 150 can engage in the channels 114-116.

In the second exemplary embodiment, a separate channel 114-116 is therefore provided for the contact sections 131-133 and the corresponding contacting devices 151-153. In addition, the additional, also separately provided access opening 117 is introduced into the web 13 to secure the connector units 130, 150 against detachment from each other and from the rail profile 10. In the second exemplary embodiment, the screw 80, which is guided through an access opening 170 of the first connector unit 130, possibly provided with a step, extends through the channel 117 into a receiving area 190 of the second connector unit 150, into which the screw 80 is screwed.

As in the first exemplary embodiment, in the second exemplary embodiment, for example, operating current and the control signal can be fed externally into the electrical conductor means 21 of the area 11. By introducing the channels 114-117 and inserting the first connector unit 130 into the area 11 and the second connector unit 150 opposite the first unit 130 into the area 12 and snapping them into place, the units 130 and 150 are in electrical contact with each other, the second connector unit 150 receives power and control signals from the first connector unit 130 and feeds the electrical conductor means 22 of the second area 12. A reverse procedure with external feed into area 12 is also possible.

Regarding operating current types and operating voltages, the type of control signals and the dimensions of the connector units 130, 150, reference is made to the above embodiments relating to the first exemplary embodiment.

In the case of the lighting devices 1, 101, only one external feed is required to supply the two areas 11, 12. Cumbersome wiring is avoided, and contacting is quick and easy. As the channels 14 or 114, 115, 116 and possibly 117 can be introduced on-site, the coupling can be achieved flexibly by means of the units 130, 150 or 30, 50 where desired in a specific assembly situation or when it appears to be advantageous.

In the case of lighting devices 1, 101, the projections 41, 61, 141-144, 161-162 and the associated recesses 55, 35, 155-156, 135 ensure that the first and second connector units 30, 50 and 130, 150 respectively are correctly positioned and aligned with each other and contact is ensured with consistently correct orientation of the units 30, 50 or 130, 150 relative to each other. In comparison to the exemplary embodiments shown, the two mutually correctly aligned units 30, 50 can alternatively be inserted into the rail profile 10 rotated by 180 degrees about the depth direction T, wherein the channels 114-117 can be created in the second exemplary embodiment by inserting the template 200 in a correspondingly rotated manner.

It should also be mentioned that in the above exemplary embodiments, some housing components of the units 30, 50 or 130, 150 can be manufactured in the same way. Specifically, both units 30, 50 and 130, 150 can each be equipped, for example, with a recess to form the access opening 70, 170 for the screw 80 and with the receiving area 90, 190, wherein it can be arranged, for example, that for an improved appearance, access opening 70, 170 is open in one of the units 30 or 50 or 130 or 150, particularly in the units 30 or 130, while in the other it is externally sealed, or that alternatively, as an intermediate step in the housing production, the access opening 70, 170 of each of the units 30, 50 or 130, 150 may initially be externally sealed and is only opened in one of the units 30 or 50 or 130 or 150 during manufacturing, in particular only in the first unit 30 or 130, for example by drilling.

Figure 19:
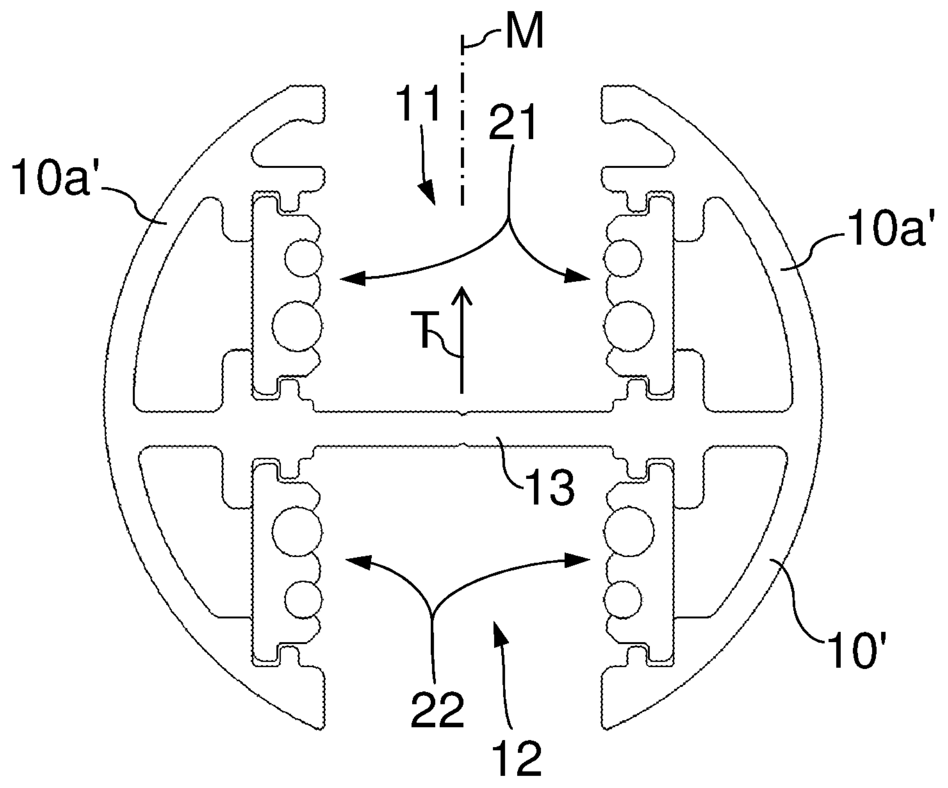
FIG. 19 a cross-sectional view of a track profile according to variants of the first and second exemplary embodiments, wherein electrical conductor means are shown.

In a variant of the first exemplary embodiment and a variant of the second exemplary embodiment, instead of the rail profile 10, a rail profile 10' with curved flanges **10*a*' in cross section, connected by the web 13 can be provided. The rail profile 10' is shown as an example in FIG. 19 and is provided with the first area 11, the second area 12 and the electrical conductor means 21, 22 in the same way as the rail profile 10. The flanges 10*a*' are, for example, each curved in the shape of a circular arc in the cross-sectional plane normal to the longitudinal extension direction L of the profile 10' and are convex on the outer side. On the inner side, the profile 10' is equipped with additional longitudinal ribs for holding the ladder devices 21, 22. Also, when viewed in cross section, the rail profile 10' is substantially symmetrical to a longitudinal centre plane M and is essentially H-shaped in design. The web 13 of the rail profile 10' is provided with the channel 14 or the channels 114-116 and, if necessary, the access opening 117**, as described above.

Although the invention has been fully described above with reference to preferred exemplary embodiments, it is not limited to these exemplary embodiments and can be modified in a variety of ways.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102023104635.7, filed Feb. 24, 2023, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

REFERENCE LIST

1, 101 lighting device
2 lighting unit
3 upper side
4 lower side
10, 10' rail profile
10*a*, 10*a*' flange
11 first area
12 second area
13 web
14 channel
114, 115 channel
116 channel
117 additional channel
21, 22 electrical conductor means
23*a*, 23*b* holding body
24*a*, 24*b* conductor for operating voltage
25*a*, 25*b* conductor for control signal
26*a*, 26*b* holding body
27*a*, 27*b* conductor for operating voltage
28*a*, 28*b* conductor for control signal
30, 130 first connector unit
31, 131 contact section
32, 132 contact section
33, 133 contact section
35, 135 recess
37 latching device
38*x*, 38*y* lateral contact element
39*x*, 39*y* lateral contact element
58*x*, 58*y* lateral contact element
59*x*, 59*y* lateral contact element
40, 140 contact element
41 projection
41*a* end edge
141, 142 projection
143, 144 projection
145 projection
49, 149 printed circuit board
50, 150 second connector unit
51, 151 contact area
52, 152 contact area
53, 153 contact area
55 recess
155, 156 recess
57 latching device
60 contact element
61 projection
61*a* end edge
161, 162 projection
165 projection
69, 169 printed circuit board
70, 170 access opening
75, 175 grip bar
80 screw
90, 190 receiving area
95, 195 grip bar
200 drilling template
214, 215 guide hole
216, 217 guide hole
b width
H height
H' height with contact elements
W length (connector unit)
L longitudinal extension direction (rail profile)
M longitudinal centre plane
T depth direction
Q3, Q5 transverse direction (connector unit)

The invention claimed is:

1. Lighting device (1; 101) with a rail profile (10; 10') with a first area (11) and a second area (12) for coupling at least one lighting unit (2) and supplying it with electrical energy and/or a control signal, wherein the first and second areas (11, 12) are each equipped with an electrical conductor means (21, 22) arranged essentially along a longitudinal extension direction (L) of the rail profile (10; 10') and separated from each other by a web (13) of the rail profile (10; 10'), and wherein at least one channel (14; 114, 115, 116) is provided in the web (13);

a first connector unit (30; 130) and a second connector unit (50; 150), wherein one of the connector units (30, 50; 130, 150) is inserted into the first area (11) and electrically contacted with the electrical conductor means (21) of the first area (11), and the other connector unit (30, 50; 130, 150) is inserted into the second area (12) and electrically contacted with the electrical conductor means (22) of the second area (12);

wherein the connector units (30, 50; 130, 150) are electrically coupled to each other through at least one channel (14; 114, 115, 116) of the web (13) for the electrical coupling of the electrical conductor means (21, 22) of the first and second areas (11, 12).

2. Lighting device according to claim 1, wherein the first connector unit (30; 130) comprises at least one contact section (31, 32, 33; 131, 132, 133) which, for coupling with the second connector unit (50; 150), electrically contacts a contacting device (51, 52, 53; 151, 152, 153) of the second connector unit (50; 150) through the channel (14; 114, 115, 116).

3. Lighting device according to claim 2,
wherein the contact section (31, 32, 33; 131, 132, 133) of the first connector unit (30; 130) projects through the channel (14; 114, 115, 116).

4. Lighting device according to claim 2,
wherein at least one projection (41; 141-144), specifically a housing projection, of the first connector unit (30; 130) is arranged adjacent to the contact section (31, 32; 131, 132) of the first connector unit (30; 130), wherein the projection (41; 141-144) extends into the channel (14; 114, 115) and in particular protrudes through the channel (14; 114, 115).

5. Lighting device according to claim 4,
wherein the projection (41; 141-144) engages with an end section thereof in a recess (55; 155, 156) of the second connector unit (50; 150).

6. Lighting device according to claim 2,
wherein at least one projection (61; 161, 162), specifically a housing projection, of the second connector unit (50; 150) is arranged adjacent to the contacting device (53; 153) of the second connector unit (50; 150), wherein the projection (61; 161, 162) extends into the channel (14; 116) and in particular protrudes through the channel (14; 116), and wherein the projection (61; 161, 162) engages with an end section thereof into a recess (35; 135) of the first connector unit (30; 130).

7. Lighting device according to claim 1,
wherein the first connector unit (30; 130) has at least two contact sections (31, 32, 33; 131, 132, 133), the at least one channel (14; 114, 115, 116) includes one channel (14) or several channels (114, 115, 116) in the web (13) and the contact sections (31, 32, 33; 131, 132, 133) protrude through the channel (14) or the channels (114, 115, 116).

8. Lighting device according to claim 1,
wherein the first connector unit (30) comprises at least two contact sections (31, 32, 33) and the second connector unit (50) comprises at least two contacting devices (51, 52, 53), each assigned to one of the contact sections (31, 32, 33), whereby at least one channel (14) is provided as a shared channel (14) for the contact sections (31, 32, 33) of the first connector unit (30) and the contact sections (31, 32, 33) each protrude through the shared channel (14).

9. Lighting device according to claim 8,
wherein at least one projection (41) of the first connector unit (30) is arranged adjacent to at least one of the contact sections (31, 32) and at least one recess (55) of the second connector unit (50) is arranged adjacent to at least one of the contacting devices (51, 52) assigned to the contact section (31, 32), wherein the projection (41) protrudes through the channel (14) and engages into the recess (55) of the second connector unit (50); and wherein at least one recess (35) of the first connector unit (30) is provided adjacent to at least another of the contact sections (33), and at least one projection (61) of the second connector unit (50) is arranged adjacent to at least one of the contacting devices (53) associated with the other contact section (33), wherein the projection (61) protrudes through the channel (14) and engages into the recess (35) of the first connector unit (30).

10. Lighting device according to claim 8,
wherein at least two of the contact sections (31, 32) are adjacent to a shared projection (41) on the first connector unit (30), specifically surrounded by the shared projection (41), and a third of the contact sections (33) is adjacent to a recess (35) on the first connector unit (30), specifically surrounded by the recess (35), and wherein at least two of the contacting devices (51, 52) are adjacent to a shared recess (55) on the second connector unit (50), specifically surrounded by the shared recess (55) and a third contacting device (53) is adjacent to a projection (61) on the second connector unit (50), specifically surrounded by the projection (61).

11. Lighting device according to claim 1,
wherein at least two, specifically at least three, channels (114, 115, 116) are provided in the web (13), and the first connector unit (130) comprises at least two, specifically at least three, contact sections (131, 132, 133) and the second connector unit (150) comprises at least two, specifically at least three, contacting devices (151, 152, 153) each assigned to the contact sections (131, 132, 133), wherein the contact sections (131, 132, 133) of the first connector unit (130) each protrude through an assigned one of the channels (114, 115, 116) in the web (13).

12. Lighting device according to claim 11,
wherein at least one of the contact sections (131, 132) is adjacent to at least one projection (141-144) on the first connector unit (130), with at least one recess (155, 156) on the second connector unit (150) arranged adjacent to at least one of the contacting devices (151, 152) assigned to the contact section (131, 132), wherein the projection (141-144) extends through the channel (114, 115) associated with the contact section (131, 132) and engages into the recess (155, 156) of the second connector unit (150); and wherein at least one other contact section (133) is adjacent to at least one recess (135) on the first connector unit (130), with at least one projection (161, 162) on the second connector unit (150) arranged adjacent to at least one of the contacting devices (153) assigned to the other contact section (133) wherein the projection (161, 162) extends through the channel (116) associated with the other contact section (133) and engages into the recess (135) of the first connector unit (130).

13. Lighting device according to claim 11,
wherein at least one projection (141-144) is provided adjacent to two of the contact sections (131, 132) and at least one recess (135) is provided on the first connector unit (130) adjacent to a third of the contact sections (133), and wherein at least one recess (155, 156) is provided adjacent to two of the contacting devices (151, 152) and at least one projection (161, 162) is provided on the second connector unit (150) adjacent to a third of the contacting devices (153).

14. Lighting device according to claim 1,
wherein a mechanical anchoring element (80), specifically a screw, is guided from one of the connector units (30, 50; 130, 150) through the channel (14) or through an additional access opening (117) in the web (13) of the track profile (10; 10') and engages, for example by being screwed, into a receiving area (90; 190) of the other connector unit (30, 50; 130, 150).

15. Lighting device according to claim 1,
wherein the first area (11) and the second area (12) are each equipped in the same way with the electrical conductor means (21, 22) and/or wherein each of the first and second connector units (30, 50; 130, 150) can alternatively be used in the first or second area (11, 12).

16. Lighting device according to claim 1,
wherein conductors (24*a, b*, 25*a, b*, 27*a, b*, 28*a, b*) of the electrical conductor means (21, 22) of each of the first and second areas (11, 12) are arranged located laterally to the connector unit (30, 50, 130, 150) used in each case; and/or wherein the electrical conductor means (21, 22) of the first and second areas (11, 12) each have conductors (24*a, b*, 25*a, b*, 27*a, b*, 28*a, b*) for providing electrical operating voltage and a control signal.

17. Lighting device according to claim 1,
wherein the rail profile (10; 10') is designed with a cross section that is essentially H-shaped as a whole or at least in certain areas, and specifically wherein the lateral flanges (10*a*; 10*a*') of the track profile (10; 10') connected by the web (13) are straight or at least partially formed as a curve in the cross section.

18. Kit for use in a lighting device (1; 101), which has a rail profile (10; 10') with a first area (11) and a second area (12) for coupling at least one lighting unit (2) and supplying it with electrical energy and/or a control signal, wherein the first and second areas (11, 12) are each equipped with an electrical conductor means (21, 22) arranged essentially along a longitudinal extension direction (L) of the rail profile (10; 10') and are separated from each other by a web (13) of the rail profile (10; 10'), and wherein at least one channel (14; 114, 115, 116) is provided in the web (13), wherein the kit comprises a first and a second connector unit (30, 50; 130, 150) and the connector units (30, 50; 130, 150) are designed such that at least one of the connector units (30, 50; 130, 150) can be inserted into the first area (11) and can be electrically contacted with the electrical conductor means (21) of the first area (11);

at least the other of the connector units (30, 50; 130, 150) can be inserted into the second area (22) and can be electrically contacted with the electrical conductor means (22) of the second area (12);

the connector units (30, 50; 130, 150) can be electrically coupled to each other through at least one channel (14; 114, 115, 116) of the web (13) for the electrical coupling of the electrical conductor means (21, 22) of the first and second areas (11, 12); and wherein the first connector unit (30; 130) comprises at least one contact section (31, 32, 33; 131, 132, 133) which is configured such that for coupling with the second connector unit (50; 150), the at least one contact section (31, 32, 33; 131, 132, 133) of the first connector unit (30; 130) can electrically contact a contacting device (51, 52, 53; 151, 152, 153) of the second connector unit (50; 150) through the channel (14; 114, 115, 116).

* * * * *